C. G. MILLER.
STRAINER.
APPLICATION FILED FEB. 15, 1915.

1,140,758.

Patented May 25, 1915.

WITNESSES
Robert N. Van Zandt
Virginia C. Spratt

INVENTOR
Carl G. Miller
BY
Raymond A. Parker
ATTORNEY

UNITED STATES PATENT OFFICE.

CARL G. MILLER, OF MOUNT CLEMENS, MICHIGAN.

STRAINER.

1,140,758.　　　Specification of Letters Patent.　　　Patented May 25, 1915.

Application filed February 15, 1915. Serial No. 8,167.

*To all whom it may concern:*

Be it known that I, CARL G. MILLER, citizen of the United States, residing at Mount Clemens, county of Macomb, State of Michigan, have invented a certain new and useful Improvement in Strainers, and declare the following to be a full, clear, and exact description of the same, such as will enable others skilled in the art to which it pertains to make and use the same, reference being had to the accompanying drawings, which form a part of this specification.

This invention relates to strainers for fuel lines leading to internal combustion engines of the hydrocarbon type.

It consists of a simple arrangement of members that may be easily disassembled and which are so constructed that ample resistance is afforded for any pressure that may be brought upon the mesh or screen that does the straining.

Figure 1:
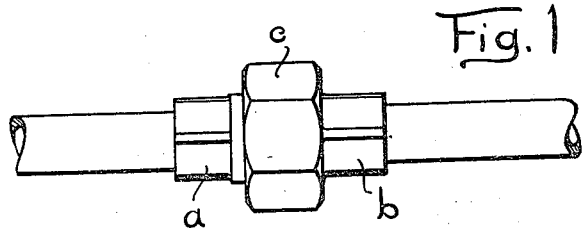
Figure 2:
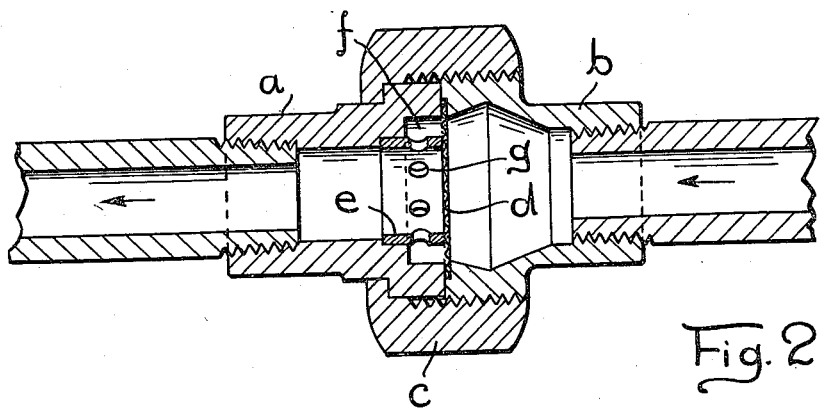
Figure 3:
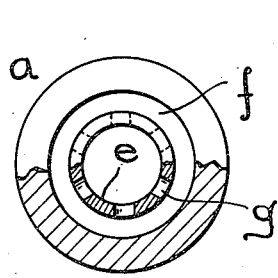
Figure 4:
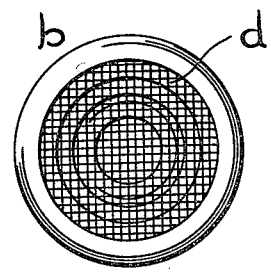

In the drawings, Figure 1 is an elevation. Fig. 2 is a longitudinal section. Fig. 3 is a plan view of the left hand part shown in Fig. 2. Fig. 4 is a plan view of the right hand part shown in Fig. 2.

The fragmentary ends of the pipe lengths that form the fuel line clearly appear in the drawings. Attached to these by pipe threads are the parts of my straining device. They comprise a pair of hollow or tubular spuds, one a shouldered spud $a$, the other an externally threaded spud $b$. A union nut $c$ is used to draw them together. One of the tubular spuds, in this case the spud $b$, is slightly recessed at its end to seat the mesh, or strainer proper, $d$. Into the other tubular spud a short sleeve $e$ is tightly driven. The tubular spud $a$ has an interior enlargement at its end as well as an exterior enlargement. Consequently when the sleeve $e$ is driven in place this leaves an annular chamber $f$. The outside of the sleeve communicates with the inside of the sleeve by means of the perforations $g$ in the sleeve. The end of the sleeve projects outwardly as far as the end of the spud $a$ and consequently acts as a support for the strainer. It will also be noticed that the tubular spud $b$ enlarges both internally and externally at the end which meets the opposite spud $a$. Consequently with this enlargement and with the chamber $f$ of the opposite spud, the straining chamber is somewhat larger than the ordinary bore of the fuel line. The purpose of this is to have the flow of the fuel practically uninterrupted by the straining operation. Of course the fuel will not flow through the wire mesh as rapidly as it will flow through an uninterrupted space, and especially is this true when dirt or the strainings accumulate against the mesh. However, in providing this enlarged area for the straining mesh, the pressure on the mesh is correspondingly increased, and in case a large head or other pressure producing means accumulates behind the fuel line, the strainer would be considerably flexed if not completely drawn out from its seat, as it is merely wire mesh made of wire of very small gage. It is to obviate this difficulty that the perforated sleeve $g$ is employed as this engages with the mesh $d$ and forms a ring-like support therefor, not only providing additional resistance to any pressure but practically preventing the wire mesh from being drawn from its seat.

It will be seen that when it is desired to clean the strainer and remove any of the strainings, it may be very easily done by screwing off the union nut $c$ and removing the mesh $d$.

What I claim is:

1. A strainer for pipe lines, having in combination, an externally threaded tubular spud, a shouldered tubular spud, the interiors of the two spuds enlarged at their meeting ends, a perforated sleeve secured in the spud farther removed from the source of flow, said sleeve forming on its outside in said tubular spud an annular chamber, a straining fabric between the two tubular spuds and supported by the end of said sleeve, and a union nut for bringing the two tubular spuds together.

2. A strainer for pipe lines, having in combination, a pair of tubular spuds, one of which is threaded and the other shouldered, a wire mesh seated in the recess on the end of one of the spuds, each of the spuds interiorly enlarging at the meeting ends, a perforated sleeve secured in the enlargement of one of the tubular spuds and forming an annular chamber thereabout, the said perforated sleeve serving also to support the wire mesh against the pressure generated from the flow of liquid against the opposite side of the screen, and a union nut for drawing the two tubular spuds together.

In testimony whereof, I sign this specification in the presence of two witnesses.

CARL G. MILLER.

Witnesses:
  STUART C. BARNES,
  VIRGINIA C. SPRATT.